United States Patent Office.

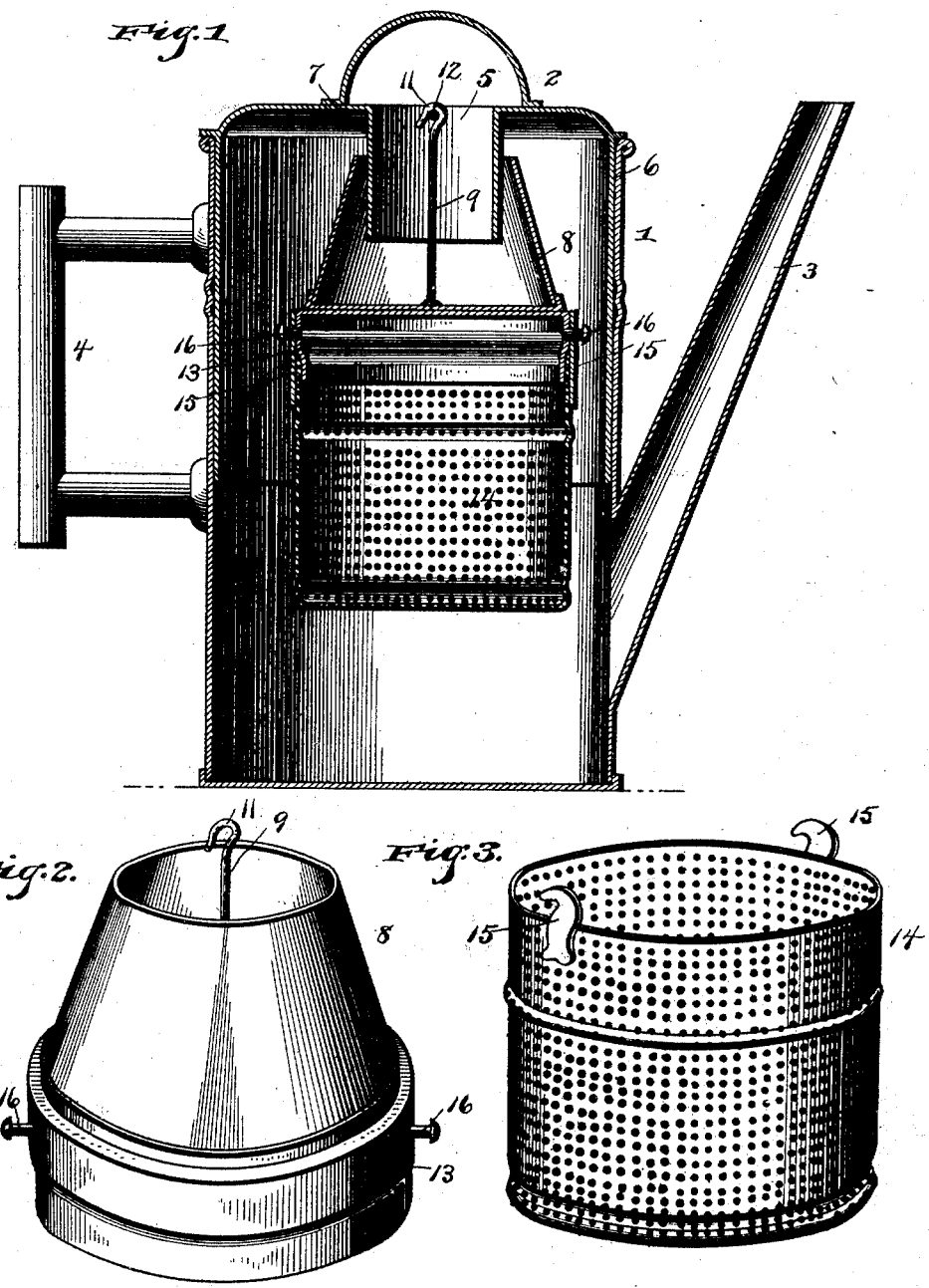

WILLIAM P. CARLIN, OF JEFFERSONTOWN, KENTUCKY, ASSIGNOR OF ONE-HALF TO JESSE M. MARLIN, OF DAWSON, GEORGIA.

COFFEE-POT.

SPECIFICATION forming part of Letters Patent No. 503,342, dated August 15, 1893.

Application filed March 15, 1893. Serial No. 466,095. (No model.)

*To all whom it may concern:*

Be it known that I, WILLIAM P. CARLIN, a citizen of the United States, residing at Jeffersontown, in the county of Jefferson and State of Kentucky, have invented a new and useful Coffee-Pot, of which the following is a specification.

The invention relates to improvements in coffee pots.

The object of the present invention is to improve the construction of coffee pots, to prevent the waste of coffee through boiling over, and to confine the aroma within the coffee-pot.

The invention consists in the construction and novel combination and arrangement of parts hereinafter fully described, illustrated in the accompanying drawings and pointed out in the claim hereto appended.

In the drawings, Figure 1 is a central vertical sectional view of a coffee pot embodying the invention. Fig. 2 is a detail perspective view of the water-seal cup. Fig. 3 is a similar view of the foraminous coffee receptacle or strainer.

Like numerals of reference indicate corresponding parts in all the figures of the drawings.

1 designates a coffee pot having a cover 2 and provided with a spout 3 and a handle 4. The cover 2 has a central opening 5 and is provided near its periphery or outer edge with a depending elongated flange or cylinder 6, designed to extend below the liquid in the coffee pot to prevent the coffee when boiling from escaping at the cover. A tube 7 depends from the cover at the central opening and extends downward within a water-seal cup 8, adapted to contain water to confine the aroma of the coffee within the pot by providing a water-seal, whereby any steam or vapors escaping will pass through the water within the water-seal cup and become condensed. The water-seal cup is adapted to swing to accommodate itself to the movement of the coffee pot when the latter is carried, and is tilted in pouring; and the said cup is provided with a central upward extending suspension rod 9 which is provided at its upper end with a hook 11 engaging a horizontal rod 12 extending across the central opening of the cover. The bottom of the cup 8 has secured to it the cover 13 of a foraminous coffee-receptacle or strainer 14, which is detachably secured to its cover 13, whereby it is suspended within the pot. The coffee receptacle or strainer 14 is provided at opposite sides with reversely disposed hooks 15 arranged at the upper edge of the coffee receptacle or strainer, and adapted to engage oppositely disposed headed projections 16 extending laterally from the depending flange of the cover 13. The cover 13 is placed on the upper edge of the coffee receptacle or strainer, and is turned to bring the lugs into engagement with the hooks, thereby securely fastening the cover on the coffee receptacle or strainer. By turning the cover in the opposite direction, the headed projections are disengaged from the hooks, and the cover 13 and the coffee receptacle or strainer may then be separated.

It will be seen that the coffee pot is simple and comparatively inexpensive in construction, that it effects a saving of coffee, and retains the aroma thereof, and that coffee cannot boil over at the cover of the pot.

Changes in the form, proportion and the minor details of construction may be resorted to without departing from the principle or sacrificing any of the advantages of this invention.

What I claim is—

The combination with a coffee pot, of a cover having a central opening and provided with an elongated cylindrical flange, a tube depending from the cover at the central opening thereof and provided at its top with a horizontal cross-rod, a water-seal cup provided with a suspension rod having a hook at its upper end and engaging the cross-rod, a cover 13 secured to the bottom of the cup and carried thereby and provided at opposite sides with laterally extending headed projections, and a foraminous coffee receptacle or strainer provided with oppositely disposed hooks adapted to engage the headed projections whereby the cover 13 is secured on the coffee receptacle or strainer, and the latter is suspended in the coffee pot, substantially as described.

In testimony that I claim the foregoing as my own I have hereto affixed my signature in the presence of two witnesses.

W. P. CARLIN.

Witnesses:
J. W. SHAFAR,
J. W. WELLS.